US012499816B2

(12) United States Patent
Liu

(10) Patent No.: US 12,499,816 B2
(45) Date of Patent: Dec. 16, 2025

(54) LED DRIVING CHIP AND LIGHT-EMITTING SUBSTRATE

(71) Applicants: Huizhou China Star Optoelectronics Display Co., Ltd., Guangdong (CN); TCL China Star Optoelectronics Technology Co., Ltd., Guangdong (CN)

(72) Inventor: Jinfeng Liu, Guangdong (CN)

(73) Assignees: Huizhou China Star Optoelectronics Display Co., Ltd., Huizhou (CN); TCL China Star Optoelectronics Technology Co., Ltd., Shenzhen (CN)

( * ) Notice: Subject to any disclaimer, the term of this patent is extended or adjusted under 35 U.S.C. 154(b) by 68 days.

(21) Appl. No.: 18/284,327

(22) PCT Filed: Mar. 31, 2023

(86) PCT No.: PCT/CN2023/085686

§ 371 (c)(1),
(2) Date: Sep. 27, 2023

(87) PCT Pub. No.: WO2024/197892

PCT Pub. Date: Oct. 3, 2024

(65) Prior Publication Data

US 2025/0095542 A1 Mar. 20, 2025

(30) Foreign Application Priority Data

Mar. 28, 2023 (CN) ........................ 202310330654.X

(51) Int. Cl.
*G09G 3/32* (2016.01)

(52) U.S. Cl.
CPC ....... *G09G 3/32* (2013.01); *G09G 2310/0297* (2013.01)

(58) Field of Classification Search
CPC ......................... G09G 3/32; G09G 2310/0297
(Continued)

(56) References Cited

U.S. PATENT DOCUMENTS 6,459,919 B1 * 10/2002 Lys ........................ H05B 45/20 600/407
6,528,954 B1 * 3/2003 Lys ........................ H05B 45/46 315/158

(Continued)

FOREIGN PATENT DOCUMENTS

CN 203225573 U * 10/2013
CN 207283878 4/2018

(Continued)

OTHER PUBLICATIONS

International Search Report and the Written Opinion Dated Dec. 21, 2023 From the International Searching Authority Re. Application No. PCT/CN2023/085686 and Its Translation Into English. (15 Pages).

*Primary Examiner* — Kwin Xie

(57) ABSTRACT

A light-emitting diode (LED) driving chip and a light-emitting substrate are provided. The LED driving chip includes a multiplexing pin for outputting a multiplexed signal. The multiplexed signal includes at least two of power information, data information, and clock information. The power information is configured to provide an operating voltage to the LED driving chip. The data information is configured to provide data signals to the LED driving chip. The clock information is configured to provide clock signals to the LED driving chip. This reduces the number of pins on the LED driving chip.

20 Claims, 5 Drawing Sheets

(58) Field of Classification Search
USPC .......................................................... 345/214
See application file for complete search history.

(56) References Cited

U.S. PATENT DOCUMENTS

| | | | | |
|---|---|---|---|---|
| 11,120,735 | B2 * | 9/2021 | Kim | H10H 20/857 |
| 2002/0180719 | A1 * | 12/2002 | Nagai | G09G 3/32<br>345/206 |
| 2010/0103185 | A1 | 4/2010 | Pannell | |
| 2021/0056892 | A1 * | 2/2021 | Wei | H10H 20/857 |
| 2021/0065614 | A1 * | 3/2021 | Kim | H01L 25/167 |

FOREIGN PATENT DOCUMENTS

| | | |
|---|---|---|
| CN | 112634834 | 4/2021 |
| CN | 112885293 | 6/2021 |
| CN | 114124228 | 3/2022 |
| CN | 115000284 | 9/2022 |

* cited by examiner

LED DRIVING CHIP AND LIGHT-EMITTING SUBSTRATE

RELATED APPLICATIONS

This application is a National Phase of PCT Patent Application No. PCT/CN2023/085686 having International filing date of Mar. 31, 2023, which claims the benefit of priority of China Patent Application No. 202310330654.X filed on Mar. 28, 2023. The contents of the above applications are all incorporated by reference as if fully set forth herein in their entirety.

FIELD OF DISCLOSURE

The present application relates to a field of display technology and in particular, to a light-emitting diode (LED) driving chip and a light-emitting substrate.

BACKGROUND TECHNOLOGY

Mini light emitting diodes (Mini LED), also known as "submillimeter light-emitting diodes", refer to a type of display composed of LEDs with die (chip) sizes of 50 micrometers to 200 micrometers. Mini LEDs fall between micro light-emitting diodes (Micro LEDs) and small-pitch displays. Mini LED applications include direct-view Mini LED displays and Mini LED backlit displays. Due to its remarkable performance in energy efficiency, color gamut, contrast, high dynamic range (HDR), flexibility, and lifespan, Mini LED displays have shown superior characteristics. Moreover, the manufacturing process is less complex compared to Micro LED, making the production of final products relatively easier. As a result, Mini LED is expected to become a leading product in the upgrade of liquid crystal displays, presenting strong competition to organic light emitting diode (OLED) displays in the consumer market.

In conventional backlight or direct display products, due to the integration of functionalities and a higher number of channels, LED driver chips have a larger number of pins, leading to increased package size of the driver chips and subsequently raising manufacturing costs.

SUMMARY OF INVENTION

Technical Problems

The present application provides an LED driving chip and a light-emitting substrate, which can reduce the number of pins on the LED driving chip, reduce the package size of the LED driving chip, thereby reducing the manufacturing costs.

Technical Solutions

In one aspect, the present application provides a light-emitting diode (LED) driving chip, including a multiplexing pin for outputting a multiplexed signal which includes at least two of power information, data information, or clock information, wherein the power information indicates an operating voltage to the LED driving chip, the data information indicates a data signal to the LED driving chip, and the clock information indicates a clock signal to the LED driving chip.

Optionally, in some embodiments of the present application, the multiplexed signal includes the power information and the data information, and the operating voltage is between a high-level value of the data signal and a low-level value of the data signal.

Optionally, in some embodiments of the present application, the multiplexed signal includes the power information and the clock information, and the operating voltage is between a high-level value of the clock signal and a low-level value of the clock signal.

Optionally, in some embodiments of the present application, the multiplexed signal includes the data information and the clock information, and a high-level value of the multiplexed signal and a low-level value of the multiplexed signal are obtained according to level values of the data signal and the clock signal.

Optionally, in some embodiments of the present application, wherein the multiplexed signal includes the power information, the data information, and the clock information; the operating voltage is between a high-level value of the data signal and a low-level value of the data signal, and a high-level value of the multiplexed signal and a low-level value of the multiplexed signal are obtained according to level values of the data signal and the clock signal.

Optionally, in some embodiments of the present application, the LED driving chip is connected to the multiplexed signal in a first period and a second period; in the first period, the multiplexed signal includes the power information and the clock information, and the operating voltage is between a high-level value of the clock signal and a low-level value of the clock signal; and in the second period, the multiplexed signal includes the power information and the data information, and the operating voltage is between a high-level value of the data signal and a low-level value of the data signal, wherein the high-level value of the data signal is equal to the high-level value of the clock signal, and the low-level value of the data signal is equal to the low-level value of the clock signal.

Optionally, in some embodiments of the present application, the LED driving chip further includes a ground pin and a plurality of output pins, the ground pin is configured to connect a ground signal, and the output pins are configured to output low-level power signals.

Optionally, in some embodiments of the present application, the multiplexing pin, the ground pin, and the output pins are spaced apart from each other and arranged on a same side of the LED driving chip.

Optionally, in some embodiments of the present application, the operating voltage ranges from 4 volts to 5.5 volts.

In another aspect, the present application provides a light-emitting substrate, including a substrate and a light-emitting diode (LED) driving chip, wherein the LED driving chip is disposed on the substrate and includes a multiplexing pin for outputting a multiplexed signal which includes at least two of power information, data information, and clock information, wherein the power information indicates an operating voltage to the LED driving chip, the data information indicates a data signal to the LED driving chip, and the clock information indicates a clock signal to the LED driving chip.

Optionally, in some embodiments of the present application, the multiplexed signal includes the power information and the data information, and the operating voltage is between a high-level value of the data signal and a low-level value of the data signal.

Optionally, in some embodiments of the present application, the multiplexed signal includes the power information and the clock information, and the operating voltage is between a high-level value of the clock signal and a low-level value of the clock signal.

Optionally, in some embodiments of the present application, the multiplexed signal includes the data information and the clock information, and a high-level value of the multiplexed signal and a low-level value of the multiplexed signal are obtained according to level values of the data signal and the clock signal.

Optionally, in some embodiments of the present application, the multiplexed signal includes the power information, the data information, and the clock information, wherein the operating voltage is between a high-level value of the data signal and a low-level value of the data signal, and a high-level value of the multiplexed signal and a low-level value of the multiplexed signal are obtained according to level values of the data signal and the clock signal.

Optionally, in some embodiments of the present application, the LED driving chip is connected to the multiplexed signal in a first period and a second period; in the first period, the multiplexed signal includes the power information and the clock information, and the operating voltage is between a high-level value of the clock signal and a low-level value of the clock signal; and in the second period, the multiplexed signal includes the power information and the data information, and the operating voltage is between a high-level value of the data signal and a low-level value of the data signal, wherein the high-level value of the data signal is equal to the high-level value of the clock signal, and the low-level value of the data signal is equal to the low-level value of the clock signal.

Optionally, in some embodiments of the present application, the LED driving chip further includes a ground pin and a plurality of output pins, the ground pin is configured to connect a ground signal, and the output pins are configured to output low-level power signals.

Optionally, in some embodiments of the present application, the multiplexing pin, the ground pin, and the output pins are spaced apart from each other and arranged on a same side of the LED driving chip.

Optionally, in some embodiments of the present application, the operating voltage ranges from 4 volts to 5.5 volts.

Optionally, in some embodiments of the present application, the light-emitting substrate further includes a multiplexed signal line, the multiplexing pin is electrically connected to one end of the multiplexed signal line, and the multiplexed signal line is configured to transmit the multiplexed signal.

Optionally, in some embodiments of the present application, the light-emitting substrate further includes a control module, wherein the control module is configured to integrate at least two of the operating voltage, the data information, or the clock information into a multiplexed signal and control an output of the multiplexed signal.

Beneficial Effects

The present application provides an LED driving chip and a light-emitting substrate. The LED driving chip includes a multiplexing pin. The multiplexing pin is provided for outputting a multiplexed signal. The multiplexed signal includes at least two of power information, data information, and clock information. The power information indicates an operating voltage to the LED driving chip. The data information indicates a data signal to the LED driving chip. The clock information indicates a clock signal to the LED driving chip. The LED driving chip reduces the number of pins on the LED driving chip by using the multiplexing pin to transmit at least two of the operating voltage, the data signal, and the clock signal, reducing the package size of the LED driving chip, thereby reducing the manufacturing costs.

BRIEF DESCRIPTION OF DRAWINGS

In order to more clearly illustrate the technical solutions of the present application, drawings which will be described in the embodiments are briefly introduced hereinafter. It is obvious that the drawings are merely for the purposes of illustrating some embodiments of the present disclosure, and persons having ordinary skill in this field can obtain other drawings according to these drawings without inventive work.

DETAILED DESCRIPTION OF EMBODIMENTS

The technical solutions of the present application will be clearly and completely described below in conjunction with the drawings and with reference to specific embodiments of the present application. Apparently, the described embodiments are only some of the embodiments of this application, not all of them. Based on the embodiments in this application, all other embodiments obtained by those skilled in the art without making creative efforts belong to the scope of protection of the present application.

The present application provides a light-emitting diode (LED) driving chip and a light-emitting substrate, capable of reducing the number of pins on the LED driving chip, minimizing the package size of the LED driving chip, and thereby lowering manufacturing costs. Detailed explanations are provided below. It should be noted that the sequence of descriptions in the following embodiments does not imply a preferred order of embodiments. Additionally, in the descriptions of the present application, the term "comprising" is used to mean "including but not limited to". The terms "first", "second", "third", etc. are used merely for identification to distinguish different objects and are not used to describe a particular order.

Figure 1:
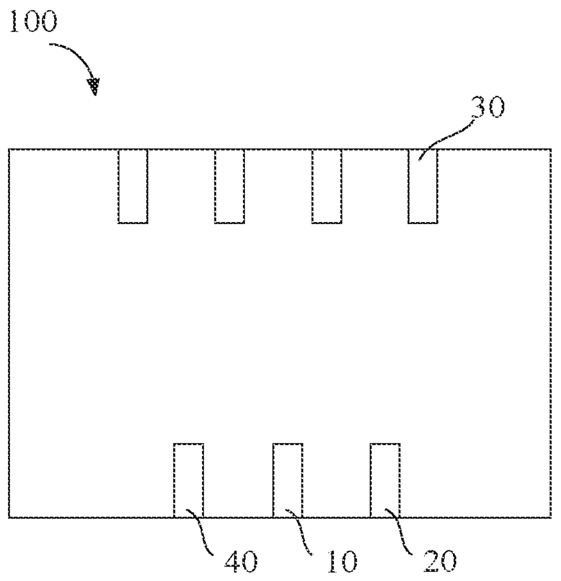
FIG. 1 is a schematic first structural view of a light-emitting diode (LED) driving chip according to one embodiment of the present application.
Figure 2:
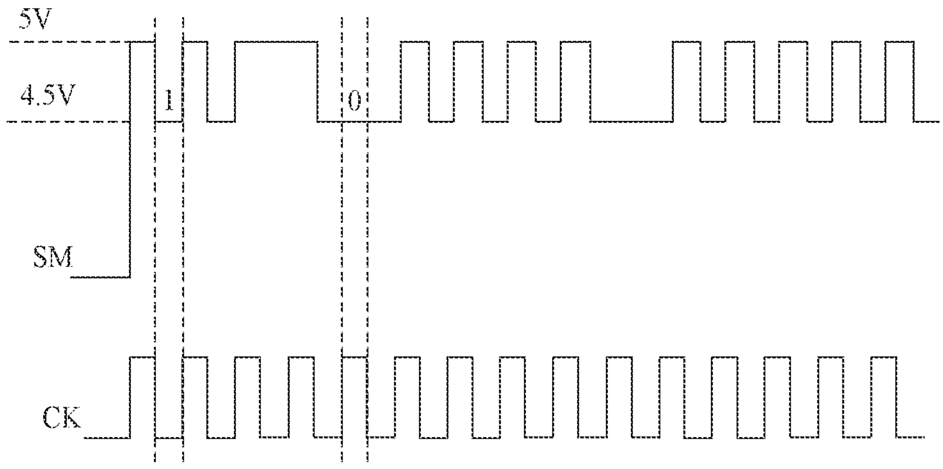
FIG. 2 is a first signal timing diagram according to one embodiment of the present application.

Please refer to FIG. 1 and FIG. 2. FIG. 1 is a schematic first structural view of the LED driving chip according to one embodiment of the present application. FIG. 2 is a first signal timing diagram according to one embodiment of the present application. As shown in FIG. 1, one embodiment of the present application provides an LED driving chip 100. The LED driving chip 100 includes a multiplexing pin 10. The multiplexing pin 10 is used for outputting a multiplexed signal. The multiplexed signal includes at least two among power information, data information, and clock information. The power information is configured to provide an operating voltage to the LED driving chip, the data information is configured to provide data signals to the LED driving chip, and the clock information is configured to provide clock signals to the LED driving chip.

The LED driving chip 100 provided in this present embodiment reduces the number of pins on the LED driving chip, minimizes the package size of the LED driving chip, and thereby lowers manufacturing costs by utilizing the multiplexing pin 10 to transmit at least two among operating voltage, data signals, and clock signals.

In one embodiment of the present application, the LED driving chip further includes a ground pin 20 and a plurality of output pins 30. The ground pin 20 is configured to connect a ground signal, and the output pins 30 are configured to output low-level power signals. As exemplified in FIG. 1, the LED driving chip includes four output pins 30, each for outputting a low-level power signal. Specifically, those skilled in the art may adjust the quantity of output pins 30 according to actual needs. The quantity of output pins 30 can be 1, 2, 3, 5, 6, and so on, as positive integers, and the present application is not specifically limited in this regard.

In an embodiment of the present application, as shown in FIG. 2, the multiplexed signal SM includes power information and data information. Specifically, the operating voltage is between a high-level value of the data signal and a low-level value of the data signal. In other words, the data information is loaded on the operating voltage, combining the two into a reset signal. When the data signal is at a high level, the operating voltage corresponds to a high potential, and when the data signal is at a low level, the operating voltage corresponds to a low potential. This design allows the multiplexing pin 10 not only to provide the operating voltage required for the proper operation of the LED driving chip but also to transmit data information, thereby controlling the brightness of the backlight.

In one embodiment of the present application, the operating voltage ranges from 4 volts to 5.5 volts. Typically, LED driver chips have a maximum and minimum operating voltage. Therefore, as long as the operating voltage of the LED driving chip falls within the range between the maximum and minimum values, the LED driving chip can maintain normal operation. Preferably, the normal operating range of the driving chip is 4 volts to 5.5 volts. As exemplified in FIG. 2, the operating voltage varies between 4.5 volts and 5 volts, ensuring proper power supply to the LED driving chip. Additionally, data information can be incorporated within the operating voltage, achieving both power supply and communication requirements. Because a data pin 50 and a power pin 60 are multiplexed into a single multiplexing pin 10, the present application effectively reduces the number of pins and connection traces. This achieves the goal of lowering manufacturing costs.

In one embodiment of the present application, the LED driving chip can further include a clock pin 40. The clock pin 40 is configured to receive a clock signal CK. Alternatively, it may not be necessary to include the clock pin 40. Those skilled in the art can pre-configure the required clock information and store it in the LED driving chip or other signal receivers. In other words, a fixed clock signal CK can be preset at a receiving end before transmitting data information. For instance, a square wave signal with a frequency of 5 Hertz can be employed as the clock signal. The data information can be collected based on this square wave signal. If the data information is represented by binary 0101, when the clock signal CK is at a high level, the status of the data signal is read. If the data signal is at a high level, it is recorded as 1; if the data signal is at a low level, it is recorded as 0. Using this method, rapid and efficient transmission of backlight brightness information can be achieved.

Figure 3:
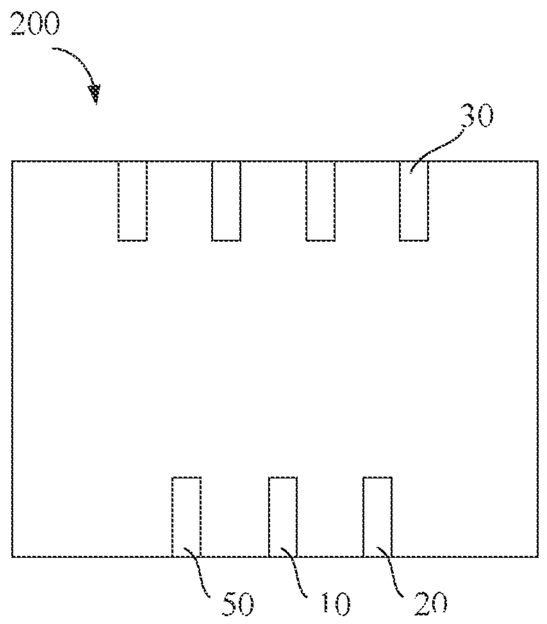
FIG. 3 is a schematic second structural view of the LED driving chip according to one embodiment of the present application.
Figure 4:
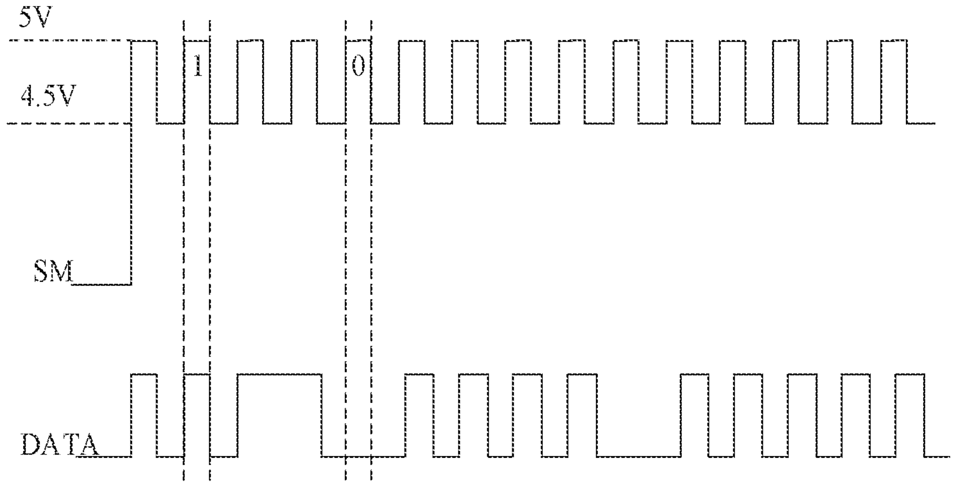
FIG. 4 is a second signal timing diagram according to one embodiment of the present application.

Please refer to FIGS. 3 and 4. FIG. 3 is a schematic second structural view of the LED driving chip according to one embodiment of the present application. FIG. 4 is a second signal timing diagram according to one embodiment of the present application. As shown in FIGS. 3 and 4, one embodiment of the present application provides a light-emitting (LED) driving chip 200. The distinction between the LED driving chip 200 and the LED driving chip 100 is as follows: in the LED driving chip 200, the multiplexed signal includes power information and clock information. Specifically, the operating voltage is between a high-level value of the clock signal and a low-level value of the clock signal.

Specifically, the LED driving chip 200 includes a multiplexing pin 10, a data pin 50, a ground pin 20, and output pins 30. The multiplexing pin 10 is used for outputting a multiplexed signal, where the multiplexed signal includes power information and clock information. The power information is used to provide the operating voltage to the LED driving chip, while the clock information is utilized to provide clock signals to the LED driving chip. The clock signal is loaded onto the operating voltage to form the multiplexed signal. The data pin 50 is used to connect data information. The data information provides data signals to the LED driving chip. The ground pin 20 is utilized to connect a ground signal. The output pins 30 are used to output low-level power signals. As exemplified in FIG. 3, the LED driving chip includes four output pins 30, each responsible for outputting a low-level power signal.

In the present embodiment, as illustrated in FIG. 4, the multiplexed signal SM includes power information and clock information. Specifically, the operating voltage is between a high-level value of the clock signal and a low-level value of the clock signal. More precisely, the operating voltage ranges from 4 volts to 5.5 volts. In other words, when the clock signal is at a high level, the operating voltage corresponds to a high potential (5.5 volts), and when the clock signal is at a low level, the operating voltage corresponds to a low potential (4.5 volts). This design enables the multiplexing pin 10 not only to provide the operating voltage necessary for the LED driving chip's proper functioning but also to transmit the clock information. This clock information is used to read the data information DATA based on the provided frequency. Specifically, the clock information is a signal of a preset frequency, such as a square wave signal with a frequency of 5 Hertz. The data information (DATA) is collected according to this square wave signal. When the data information DATA is in binary form as 0101, during a high-level clock signal, the status of the data signal DATA is read. If the data signal DATA is at a high level, it is recorded as 1; if the data signal DATA is at a low level, it is recorded as 0. This approach enables rapid and efficient reading and transmission of backlight brightness information.

The LED driving chip 200 provided in this present exemplary embodiment reduces the number of pins on the LED driving chip 200, minimizes the package size of the LED driving chip 200, and thereby lowers manufacturing costs by utilizing the multiplexing pin 10 to transmit the operating voltage and the clock signal.

Figure 5:
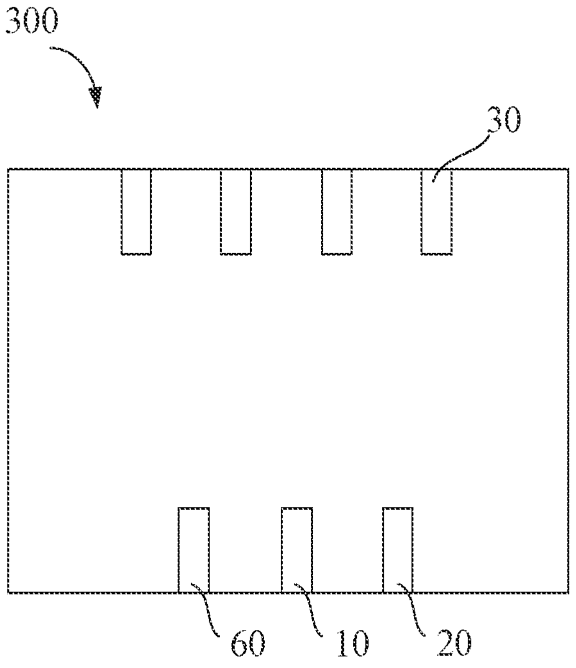
FIG. 5 is a schematic third structural view of the LED driving chip according to one embodiment of the present application.
Figure 6:
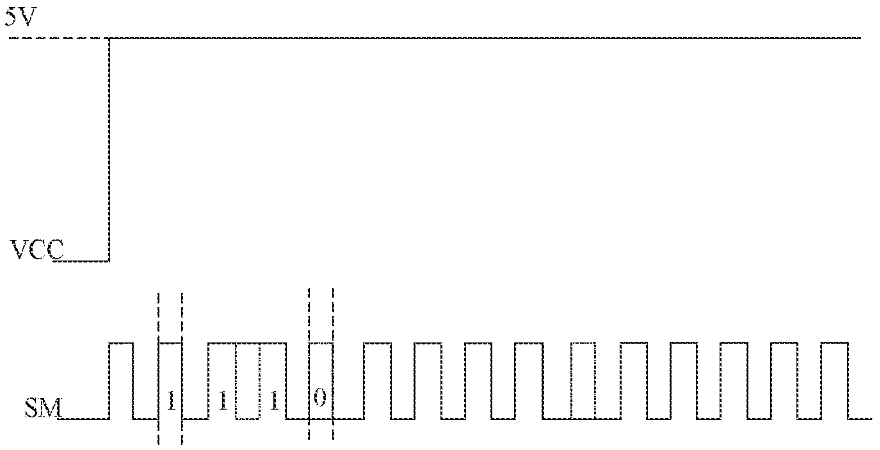
FIG. 6 is a third signal timing diagram according to one embodiment of the present application.

Please refer to FIG. 5 and FIG. 6. FIG. 5 is a third schematic structural view of the LED driving chip according to one embodiment of the present application. FIG. 6 is a third signal timing diagram according to one embodiment of the present application. As shown in FIGS. 5 and 6, one embodiment of the present application provides a light-emitting diode (LED) driving chip 300. The distinction between the LED driving chip 300 and the LED driving chip 100 is as follows: In the LED driving chip 300, the multiplexed signal includes data information and clock information. Specifically, a high-level value and a low-level value of the multiplexed signal are obtained according to the level values of the data signal and the clock signal. Specifically, the high level of the clock signal is equivalent to the high level of the data signal, and the low level of the clock signal is equivalent to the low level of the data signal.

Specifically, the LED driving chip 300 includes a multiplexing pin 10, a power pin 60, a ground pin 20, and an output pin 30. The multiplexing pin 10 is used for outputting a multiplexed signal. The multiplexed signal includes data information and clock information. The clock information is utilized to provide clock signals to the LED driving chip, while the data information is used to provide data signals to the LED driving chip. The power pin 60 is used to connect power information. The power information is used to provide the operating voltage to the LED driving chip. The ground pin 20 is utilized to connect a ground signal. The output pins 30 are used to output low-level power signals. As exemplified in FIG. 5, the LED driving chip includes four output pins 30, each responsible for outputting a low-level power signal.

In this present exemplary embodiment, as illustrated in FIG. 6, the multiplexed signal SM includes data information and clock information. Specifically, a high-level value and a low-level value of the multiplexed signal SM are determined by the level values of the data signal and the clock signal. Specifically, the high level of the clock signal is equivalent to the high level of the data signal, and the low level of the clock signal is equivalent to the low level of the data signal. The operating voltage VCC is 5 volts. This design enables the multiplexing pin 10 not only to provide data information but also to transmit clock information. The clock information is used to read data information based on the provided clock signal. Specifically, the clock information is a signal of a preset frequency, such as a square wave signal with a frequency of 5 Hertz. The data information is collected according to this square wave signal. When the data information DATA is in binary form as 0101, during a high-level clock signal, the status of the data signal DATA is read. If the data signal DATA is at a high level, it is recorded as 1; if the data signal DATA is at a low level, it is recorded as 0. This approach enables rapid and efficient reading and transmission of backlight brightness information.

The LED driving chip 300 provided in this present embodiment reduces the number of pins on the LED driving chip, minimizes the package size of the LED driving chip, and thereby lowers manufacturing costs by utilizing the multiplexing pin 10 to transmit the data signals and clock signals.

Figure 7:
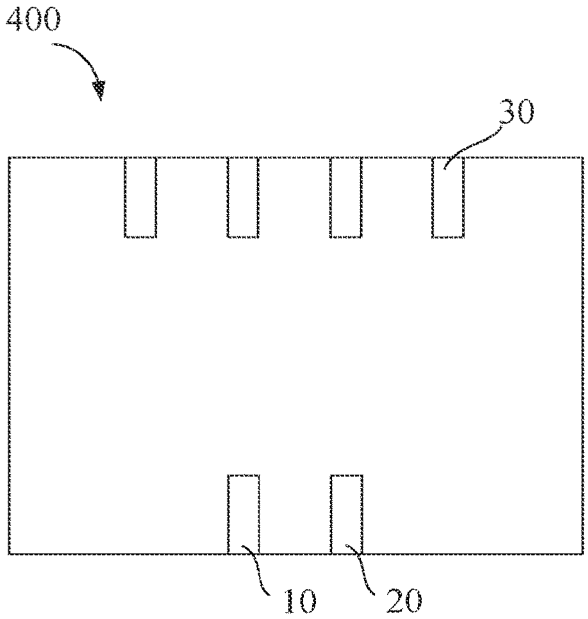
FIG. 7 is a schematic fourth structural view of the LED driving chip according to one embodiment of the present application.
Figure 8:
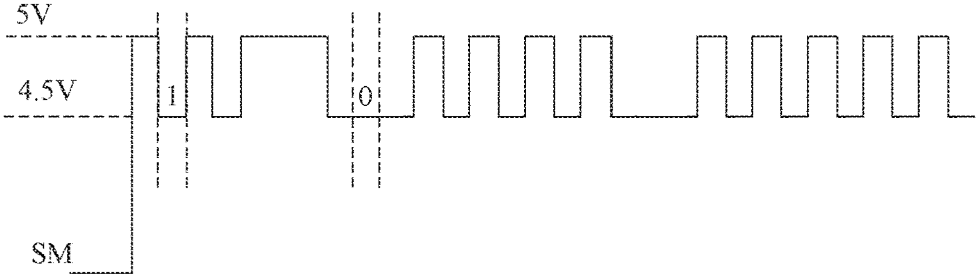
FIG. 8 is a fourth signal timing diagram according to one embodiment of the present application.

Please refer to FIGS. 7 and 8. FIG. 7 illustrates a schematic fourth structural view of the LED driving chip according to one embodiment of the present application. FIG. 8 depicts a fourth signal timing diagram provided in this present embodiment. As shown in FIGS. 7 and 8, this present embodiment offers an LED driving chip 400. The distinction between LED driving chip 400 and LED driving chip 100 is as follows: In the LED driving chip 400, the multiplexed signal includes power information, data information, and clock information. Specifically, the operating voltage is between a high-level value of the data signal and a low-level value of the data signal. Furthermore, a high-level value and a low-level value of the multiplexed signal are obtained according to the level values of the data signal and the clock signal.

Specifically, the LED driving chip 400 includes a multiplexing pin 10, a ground pin 20, and output pins 30. The multiplexing pin 10 is used for outputting a multiplexed signal. The multiplexed signal includes power information, data information, and clock information. The power information is utilized to provide the operating voltage to the LED driving chip, the data information is used to provide data signals to the LED driving chip, and the clock information is used to provide clock signals to the LED driving chip. The data signal and clock signal are loaded onto the operating voltage to form the multiplexed signal. The ground pin 20 is utilized to connect a ground signal. The output pins 30 are employed to output low-level power signals. As exemplified in FIG. 7, the LED driving chip includes four output pins 30, each responsible for outputting a low-level power signal.

In this present exemplary embodiment, as illustrated in FIG. 8, the multiplexed signal SM includes power information, data information, and clock information. Specifically, the operating voltage is between a high-level value of the data signal and a low-level value of the clock signal. Moreover, the high level of the clock signal is equivalent to the high level of the data signal, and the low level of the clock signal is equivalent to the low level of the data signal. The operating voltage ranges from 4 volts to 5.5 volts. In other words, when the data signal is at a high level, the operating voltage corresponds to a high potential (5.5 volts), and when the data signal is at a low level, the operating voltage corresponds to a low potential (4.5 volts). This design enables the multiplexing pin 10 to provide not only the operating voltage required for the LED driving chip's normal operation but also to transmit data information and clock information. The clock information is used to read data information based on the provided clock signal. Specifically, the clock information is a signal of a preset frequency, such as a square wave signal with a frequency of 5 Hertz. The data information is collected according to this square wave signal. When the data information DATA is in binary form as 0101, during a high-level clock signal, the status of the data signal DATA is read. If the data signal DATA is at a high level, it is recorded as 1; if the data signal DATA is at a low level, it is recorded as 0. This approach enables rapid and efficient reading and transmission of backlight brightness information.

The LED driving chip 200 provided in this present exemplary embodiment reduces the number of pins on the LED driving chip 200, minimizes the package size of the LED driving chip 200, and thereby lowers manufacturing costs by utilizing the multiplexing pin 10 to transmit the operating voltage, the data signal, and the clock signal.

Figure 9:
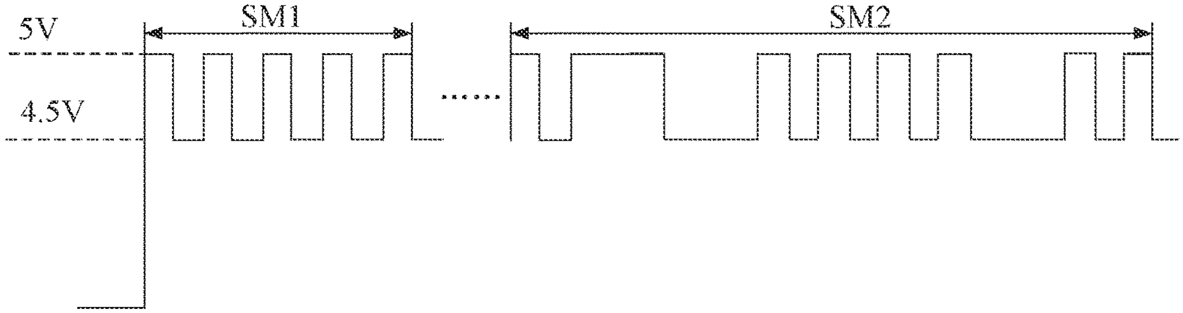
FIG. 9 is a fifth signal timing diagram according to one embodiment of the present application.

Please refer to FIG. 9. FIG. 9 illustrates a fifth signal timing diagram according to one embodiment of the present application. As depicted in FIG. 9, the LED driving chip connects the multiplexed signal SM in a first period and a second period. In the first period, the multiplexed signal SM1 includes the power information and the clock information, with the operating voltage lying between the high-level value of the clock signal and the low-level value of the clock signal. In the second period, the multiplexed signal SM2 includes the power information and the data information, with the operating voltage ranging between the high level of the data signal and the low level of the data signal. Moreover, the high level of the data signal is equivalent to the high level of the clock signal, and the low level of the data signal is equivalent to the low level of the clock signal.

Specifically, the operating voltage ranges from 4 volts to 5.5 volts. In other words, when the data signal or clock signal is at a high level, the operating voltage corresponds to a high potential (5.5 volts), and when the data signal or the clock signal is at a low level, the operating voltage corresponds to a low potential (4.5 volts). This design allows the multiplexing pin 10 to not only provide the operating voltage required for the LED driving chip's normal operation but also to enable time-division transmission of the data information and the clock information. It further enables the reading of the data information based on the provided clock signal information. Specifically, the clock information is a signal of a preset frequency, such as a square wave signal with a frequency of 5 Hertz. When the data information DATA is in binary form as 0101, during a high-level clock signal, the status of the data signal DATA is read. If the data signal DATA is at a high level, it is recorded as 1; if the data signal DATA is at a low level, it is recorded as 0. This approach enables rapid and efficient reading and transmission of backlight brightness information.

Figure 10:
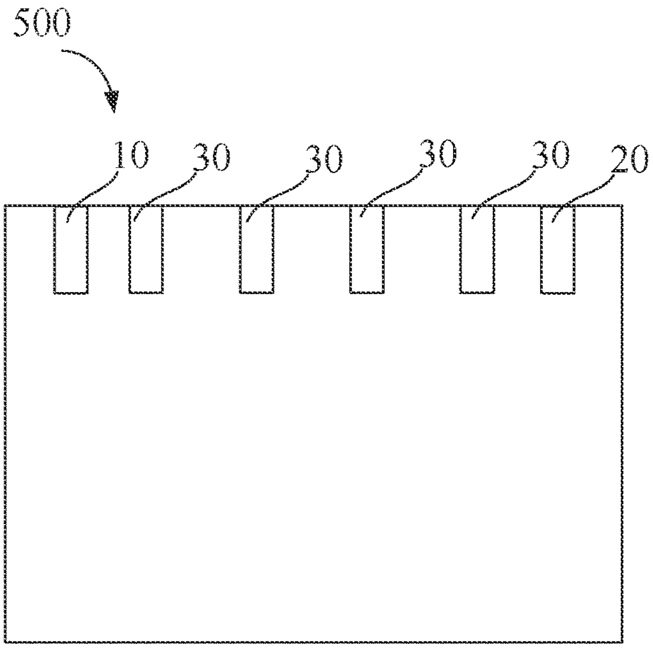
FIG. 10 is a schematic fifth structural view of the LED driving chip according to one embodiment of the present application.

Please refer to FIG. 10. FIG. 10 illustrates a fifth structural schematic view of the LED driving chip according to one embodiment of the present application. As depicted in FIG. 10, this present embodiment provides a LED driving chip 500. The difference between the LED driving chip 500 and the LED driving chip 400 lies in the arrangement: the multiplexed pin 10, the ground pin 20, and the output pins 30 are spaced apart and located on a same side of the LED driving chip. This configuration is advantageous for further reducing the packaging size of the LED driving chip and subsequently lowering manufacturing costs.

Specifically, the LED driving chip 500 includes a multiplexing pin 10, a ground pin 20, and output pins 30. The multiplexing pin 10 is configured to output a multiplexed signal. The multiplexed signal includes power information, data information, and clock information. The power information is configured to provide an operating voltage to the LED driving chip, the data information is configured to provide data signals to the LED driving chip, the clock information is configured to provide clock signals to the LED driving chip. The data signal and the clock signal are loaded on the operating voltage to form the multiplexed signal. The ground pin 20 is configured to connect a ground signal, and the output pins 30 are configured to output low-level power signals. As exemplified in FIG. 10, the LED driving chip includes four output pins 30, each of the output pins 30 outputs a low-level power signal.

Figure 11:
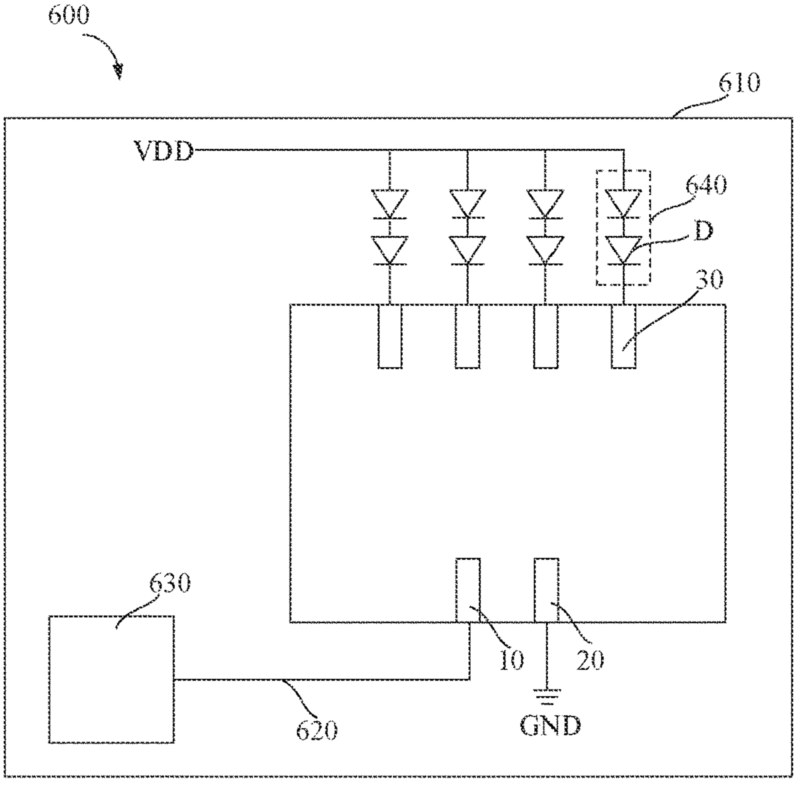
FIG. 11 is a schematic structural view of a light-emitting substrate according to one embodiment of the present application.

Please refer to FIG. 11. FIG. 11 is a schematic structural view of a light-emitting substrate according to one embodiment of the present application. As shown in FIG. 11, the present application provides a light-emitting substrate 600, the light-emitting substrate 600 includes a substrate 610 and any LED driving chip mentioned above. The LED driving chip is disposed on the substrate 610. FIG. 11 uses the LED driving chip 400 as an example.

In the embodiment of the present application, the light-emitting substrate 600 further includes a multiplexing signal line 620. The multiplexing pin 10 is electrically connected to one end of the multiplexing signal line 620. The multiplexing signal line 620 is used for transmitting the multiplexed signal.

In one embodiment of the present application, the light-emitting substrate 600 further includes a control module 630. The control module 630 is configured to integrate at least two of the operating voltage, the data information, or the clock information into a multiplexed signal, and control the output of the multiplexed signal.

In one embodiment of the present application, the light-emitting substrate 600 further includes a ground line. One end of the ground pin 20 is electrically connected to the ground line, and another end of the ground line is grounded.

In one embodiment of the present application, the light-emitting substrate 600 further includes a plurality of LED light groups 640. As exemplified in FIG. 11, there are four light groups 640 illustrated. Each light group 640 includes at least two electrically connected light-emitting diodes D. Those skilled in the art may adjust the quantity of light groups 640 and the number of light-emitting diodes D in each light group 640 as needed; the present application is not limited in this regard. Specifically, in the LED light groups 640, a cathode of each of the light-emitting diodes D arranged close to the LED driving chip is electrically connected to the corresponding output pin 30. In FIG. 11, the four LED light groups 640 are electrically connected to the four output pins 30, respectively; in the LED light groups 640, an anode of each light-emitting diode D arranged away from the LED driving chip is connected to a high-level power supply voltage VDD. Specifically, the anodes, of the light-emitting diodes D in the LED light groups 640, arranged away from the LED driving chip may be electrically connected to different power supply lines, enabling the independent control of the LED light groups 640 to emit light. Alternatively, the LED light groups 640 can be collectively connected to a single power supply line, enabling simultaneous activation and emission of light.

The present application provides an LED driving chip and a light-emitting substrate. The LED driving chip includes a multiplexing pin 10. The multiplexing pin 10 is provided for outputting a multiplexed signal. The multiplexed signal includes at least two of power information, data information, or clock information. The power information is configured to provide an operating voltage to the LED driving chip. The data information is configured to provide data signals to the LED driving chip. The clock information is configured to provide clock signals to the LED driving chip. The LED driving chip uses the multiplexing pin 10 to transmit at least two of the operating voltage, the data signal, and the clock signal, thereby reducing the number of pins on the LED driving chip, reducing the package size of the LED driving chip, thereby reducing the manufacturing costs.

The above describes in detail an LED driving chip and a light-emitting substrate of the present application. The principles of the present application are elaborated in this disclosure using specific examples. The description of the above embodiments is only used to help understand the method and main ideas of the present application. Those skilled in the art, according to the idea of the present application, can change the embodiments and the application range. In summary, the content of this specification should not be understood as a limitation on the present application.

What is claimed is:

1. A light-emitting diode (LED) driving chip, comprising a single multiplexing pin for outputting a multiplexed signal which comprises at least two of power information, data information, or clock information multiplexed, wherein the power information provides an operating voltage to the LED driving chip, the data information provides a data signal to the LED driving chip, and the clock information provides a clock signal to the LED driving chip, wherein the operating voltage varies between a first voltage level corresponding to a logic high level and a second voltage level corresponding to a logic low level, wherein when the multiplexed signal comprises the power information, the operating voltage:

serves as both a power supply and a signal carrier;

maintains each of the first and second voltage levels consistently during a duration of a respective corresponding logic state; and transitions directly between the first and second voltage levels in synchronization with corresponding logic level changes of the data signal or clock signal.

2. The LED driving chip according to claim 1, wherein the multiplexed signal comprises the power information and the data information, and the operating voltage is between a high-level value of the data signal and a low-level value of the data signal, wherein when the data signal is at the high-level value, the operating voltage is at a high potential, and when the data signal is at the low-level, the operating voltage is at a low potential.

3. The LED driving chip according to claim 1, wherein the multiplexed signal comprises the power information and the clock information, and the operating voltage is between a high-level value of the clock signal and a low-level value of the clock signal, wherein when the clock signal is at the high-level value, the operating voltage is at a high potential, and when the clock signal is at a low level, the operating voltage is at a low potential.

4. The LED driving chip according to claim 1, wherein the multiplexed signal comprises the data information and the clock information, and a high-level value of the multiplexed signal and a low-level value of the multiplexed signal are obtained according to level values of the data signal and the clock signal.

5. The LED driving chip according to claim 1, wherein the multiplexed signal comprises the power information, the data information, and the clock information; and the operating voltage is between a high-level value of the data signal and a low-level value of the data signal, and a high-level value of the multiplexed signal and a low-level value of the multiplexed signal are obtained according to level values of the data signal and the clock signal.

6. The LED driving chip according to claim 1, wherein the LED driving chip is connected to the multiplexed signal in a first period and a second period;

in the first period, the multiplexed signal comprises the power information and the clock information, and the operating voltage is between a high-level value of the clock signal and a low-level value of the clock signal; and in the second period, the multiplexed signal comprises the power information and the data information, and the operating voltage is between a high-level value of the data signal and a low-level value of the data signal, wherein the high-level value of the data signal is equal to the high-level value of the clock signal, and the low-level value of the data signal is equal to the low-level value of the clock signal.

7. The LED driving chip according to claim 1, wherein the LED driving chip further comprises a ground pin and a plurality of output pins, the ground pin is configured to connect a ground signal, and the output pins are configured to output low-level power signals.

8. The LED driving chip according to claim 7, wherein the multiplexing pin, the ground pin, and the output pins are spaced apart from each other and arranged on a same side of the LED driving chip.

9. The LED driving chip according to claim 1, wherein the operating voltage ranges from 4 volts to 5.5 volts.

10. A light-emitting substrate, comprising a substrate and a light-emitting diode (LED) driving chip disposed on the substrate, the LED driving chip comprising a single multiplexing pin for outputting a multiplexed signal which comprises at least two of power information, data information, and clock information multiplexed, wherein the power information provides an operating voltage to the LED driving chip, the data information provides a data signal to the LED driving chip, and the clock information provides a clock signal to the LED driving chip, wherein the operating voltage varies between a first voltage level corresponding to a logic high level and a second voltage level corresponding to a logic low level, wherein when the multiplexed signal comprises the power information, the operating voltage:

serves as both a power supply and a signal carrier;

maintains each of the first and second voltage levels consistently during a duration of a respective corresponding logic state; and transitions directly between the first and second voltage levels in synchronization with corresponding logic level changes of the data signal or clock signal.

11. The light-emitting substrate according to claim 10, wherein the multiplexed signal comprises the power information and the data information, and the operating voltage is between a high-level value of the data signal and a low-level value of the data signal, wherein when the data signal is at the high-level value, the operating voltage is at a high potential, and when the data signal is at the low-level, the operating voltage is at a low potential.

12. The light-emitting substrate according to claim 10, wherein the multiplexed signal comprises the power information and the clock information, and the operating voltage is between a high-level value of the clock signal and a low-level value of the clock signal, wherein when the clock signal is at the high-level value, the operating voltage is at a high potential, and when the clock signal is at a low level, the operating voltage is at a low potential.

13. The light-emitting substrate according to claim 10, wherein the multiplexed signal comprises the data information and the clock information, and a high-level value of the multiplexed signal and a low-level value of the multiplexed signal are obtained according to level values of the data signal and the clock signal.

14. The light-emitting substrate according to claim 10, wherein the multiplexed signal comprises the power information, the data information, and the clock information, wherein the operating voltage is between a high-level value of the data signal and a low-level value of the data signal, and a high-level value of the multiplexed signal and a low-level value of the multiplexed signal are obtained according to level values of the data signal and the clock signal.

15. The light-emitting substrate according to claim 10, wherein the LED driving chip is connected to the multiplexed signal in a first period and a second period;

in the first period, the multiplexed signal comprises the power information and the clock information, and the operating voltage is between a high-level value of the clock signal and a low-level value of the clock signal; and in the second period, the multiplexed signal comprises the power information and the data information, and the operating voltage is between a high-level value of the data signal and a low-level value of the data signal, wherein the high-level value of the data signal is equal to the high-level value of the clock signal, and the low-level value of the data signal is equal to the low-level value of the clock signal.

16. The light-emitting substrate according to claim 10, wherein the LED driving chip further comprises a ground pin and a plurality of output pins, the ground pin is configured to connect a ground signal, and the output pins are configured to output low-level power signals.

17. The light-emitting substrate according to claim 16, wherein the multiplexing pin, the ground pin, and the output pins are spaced apart from each other and arranged on a same side of the LED driving chip.

18. The light-emitting substrate according to claim 10, wherein the operating voltage ranges from 4 volts to 5.5 volts.

19. The light-emitting substrate according to claim 10, wherein the light-emitting substrate further comprises a multiplexed signal line, the multiplexing pin is electrically connected to one end of the multiplexed signal line, and the multiplexed signal line is configured to transmit the multiplexed signal.

20. The light-emitting substrate according to claim 10, wherein the light-emitting substrate further comprises a control module, wherein the control module is configured to integrate at least two of the operating voltage, the data information, or the clock information into a multiplexed signal and control an output of the multiplexed signal.

* * * * *